United States Patent [19]

Behnke et al.

[11] Patent Number: 4,698,565

[45] Date of Patent: Oct. 6, 1987

[54] HOIST WITH OVERLOAD SAFETY PROTECTION

[75] Inventors: Klaus Behnke; Anton Münzenbrock, both of Dortmund, Fed. Rep. of Germany

[73] Assignee: Mannesmann Aktiengesellschaft, Dusseldorf, Fed. Rep. of Germany

[21] Appl. No.: 756,749

[22] Filed: Jul. 18, 1985

[30] Foreign Application Priority Data

Jul. 20, 1984 [DE] Fed. Rep. of Germany ....... 3426746

[51] Int. Cl.[4] .............................................. H02P 7/67

[52] U.S. Cl. ...................................... 318/318; 318/51; 318/434; 318/563

[58] Field of Search .................... 318/5, 129, 318, 430, 318/431, 432, 433, 434, 475, 488, 572, 609, 674, 318, 51, 563

[56] References Cited

U.S. PATENT DOCUMENTS

| | | | |
|---|---|---|---|
| 2,466,167 | 4/1949 | Foulds | 318/51 X |
| 3,725,762 | 4/1973 | Levesque | 318/609 X |
| 3,836,834 | 9/1974 | Abbatiello et al. | 318/488 X |
| 4,194,145 | 3/1980 | Ritter | 318/431 X |

*Primary Examiner*—William M. Shoop, Jr.
*Assistant Examiner*—Bentsu Ro
*Attorney, Agent, or Firm*—Karl F. Ross; Herbert Dubno

[57] ABSTRACT

The hoist, lifting apparatus or the like of our invention comprises at least one hoist motor, a protective controller for the hoist motor, and an overload safety device operating on the protective controller, wherein the overload safety device has a cable load force pick-up with a tension measuring bridge, an analyzer, and a mechanism for suppression of load peaks in periodic load fluctuations. The tension measuring bridge is connected with two connecting conductors to a bridge supply generator and has two output conductors for transmission of the output signal of the tension measuring bridge. The analyzer acts on the protective controller for the hoist motor. Between the analyzer and the tension measuring bridge is a frequency converter with associated frequency generator which changes the output signal of the measuring bridge into a periodic signal. The analyzer has at least one counter with an adjustable initial state, at least one analyzer controller and a frequency divider, which produces a periodic control signal as a gate pulse for the counter from a reference frequency of normal frequency. With the counter during the gate pulse the cycles are countable, which includes the periodic signal of the frequency converter. The controller is disconnected by the counter, when a given counting state during the gate pulse is equaled or exceeded. The gate pulse is so adjusted that it equals or exceeds the period of the load fluctuations.

5 Claims, 3 Drawing Figures

HOIST WITH OVERLOAD SAFETY PROTECTION

FIELD OF THE INVENTION

Our present invention relates to hoists, i.e. lifting apparatus, and, more particularly, to a hoist having at least one hoist motor with a motor controller and an overload safety arrangement acting upon this controller to halt operation of the hoist in an overload condition.

BACKGROUND OF THE INVENTION

Hoists of winches, cranes, gantries, and the like generally comprise at least one lifting or hoist motor, a protective controller for this motor (hereinafter referred to as the motor controller) which can be equipped with circuit breakers, relays and the like, and an overload safety device operating on the motor controller.

The overload safety device can have a rope, cable or other load pick-up with a cable-tension measuring bridge circuit, an electrical analyzer, and a mechanism for suppression of the load peaks from periodic oscillation of the load.

The cable-tension measuring bridge is connected by two conductors to a bridge voltage supply generator and has two output conductors for transmission of the cable-tension measuring bridge output signals.

The analyzer acts in response to overload on the protective controller for the hoist motors.

The cable-tension measuring bridge can be a strain gauge bridge which is mounted to measure the loading or cable tension.

In the hoist of German Patent document (open application DE-OS No. 25 16 768) the circuits are so constructed that the output signal of the measuring bridge after amplification serves as an input signal for several voltage dependent circuits of the analyzer, which can reverse an output contacts when the value of the voltage at its input and therefore the size of the load exceeds a fixed value upon the cable of the hoist motors.

A load table is provided. The output terminals of the circuit act on the protective controller so that the hoist operation on exceeding of a definite value of the load is halted. On the load table the load appears, for example in a digital representation.

The apparatus is provided with means for compensation of the dynamic load peaks which can be a cross bar for the cable with two side plates lying opposite one another and to which the strain gauges associated with the tension measuring bridge are attached.

By this arrangement an erroneous value for a load oscillating transverse to the cross bar will be compensated for or equalized, since when one cross bar side is loaded by the oscillating load, the other cross bar side is simultaneously unloaded. The system therefore responds to the mean value of the load.

This approach is only limitedly effective and suffers as to precision.

Moreover with a very steeply climbing load (for example, in setting the hook on the load) an impermissibly long shut-off delay can result. In the earlier constructions it is possible to calibrate the cable load pick-up and the analyzer separately and to interchange them independently of each other without joint calibration, which has proven to be advantageous for mounting and maintenance techniques. In order to achieve this interchangeability with the cable load pick up the null or zero point and sensitivity must be calibrated to a definite value.

Additionally the supply voltage for the measuring bridge in the analyzer, the amplifier and the offset voltage of the difference amplifiers as well as the voltage dependent circuits must be calibrated.

The precision and functional reliability of the entire arrangement depends in particular on the constancy and precision of this calibration and of the structural or circuit elements used. This is true especially when dynamic load peaks occur.

OBJECTS OF THE INVENTION

It is an object of our invention to provide an improved hoist, lift apparatus or the like.

It is also an object of our invention to provide a hoist, lift apparatus or the like with a motor controller having an overload safety device of greater precision and functional reliability than those of the prior art.

SUMMARY OF THE INVENTION

These objects and others which will become more apparent hereinafter are attained in accordance with our invention in a hoist having at least one hoist motor, a motor controller for the hoisting motor, and an overload safety device acting on the protective controller.

According to the invention the overload safety device includes a cable load pick-up with a tension measuring bridge, an analyzer, and means for suppressing dynamic load peaks in periodic load fluctuations.

The tension measuring bridge is connecting by two conductors to a bridge supply voltage generator and has two output conductors for transmission of the output signal of the tension measuring bridge, and further the analyzer acts on the protective controller of the hoist motor.

According to our invention, between the tension measuring bridge and analyzer a frequency converter with frequency generator is connected, which frequency converter transforms the output signal of the measuring bridge into a frequency which is proportional thereto. The analyzer has at least one counter with a settable initial state, at least one switch and a frequency divider, which produces a periodic control signal as a gate time or duration for the counter from a reference frequency of a reference source, so that during the gate pulse, cycles are countable which derive from the periodic signal of the frequency converter. The switch is disconnected by the counter, when a given counter state in the gate pulse is reached or exceeded. The gate pulse time or duration is so selected that it equals or exceeds the duration of the load fluctuations. We can use a down counting and the analyzer responsive to falling below the gate pulse duration.

In order to be able to operate with high precision in regard to the overload safety device, an advantageous feature of the invention, to be taken in combination with the previously described features, utilizes a frequency converter which has a bridge supply voltage generator which can be preset.

For increasing the reliability the frequency converter is calibrated to a minimum frequency corresponding to the null or zero load. For the same reason in the analyzer the frequency signal as well as gate pulse are suitably monitored.

The hoist of our invention can have a hoist operation with only one speed or a hoist operation with several hoist speeds. Particularly within the scope of our invention is an embodiment with fast and slow hoist operations.

This embodiment is particularly characterized in that the analyzer has two counters, which are supplied with different gate pulses or durations by the frequency divider means. A first of these gate durations is associated with a given partial load and the first counter, and a second gate duration is associated with the rated load as well as the second counter. During the lifting stage the fast lifting speed is cut out.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
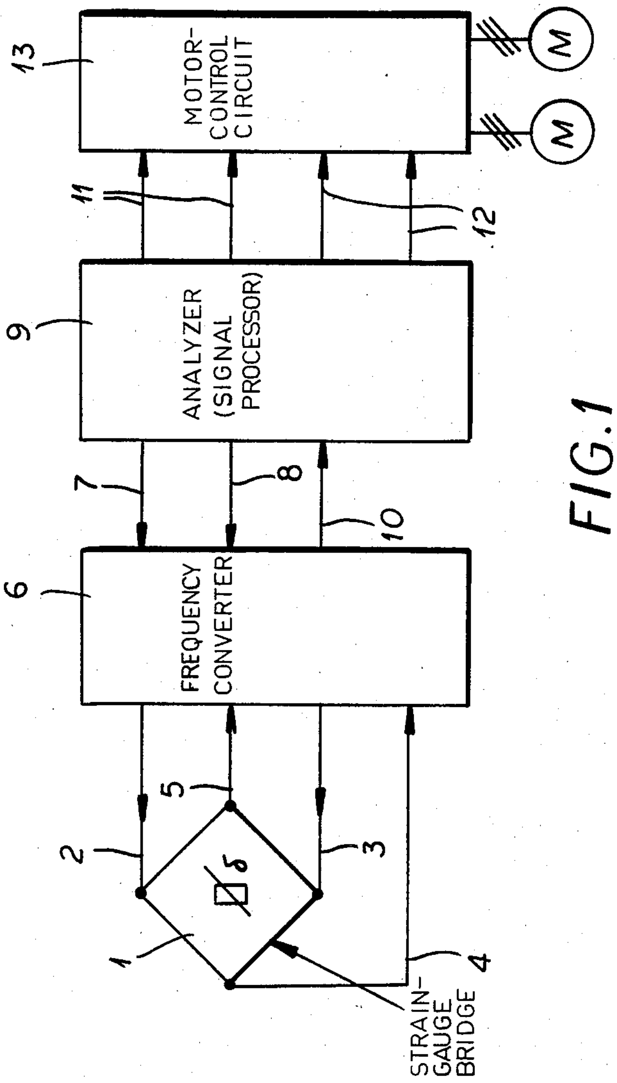
FIG. 1 is a schematic block diagram of a hoist according to our invention with two hoisting motors and the associated electrical control network.

FIG. 1 shows a hoist according to our invention, in which a tension measuring bridge 1 or strain-gauge bridge measuring cable load is connected by the conductors 2 and 3 to the bridge supply voltage source and by the output conductors 4 and 5 for the bridge output voltage to a frequency converter 6.

The expression "frequency converter" as used here means a voltage/frequency changing device.

The frequency converter 6 is provided by the conductors 7 and 8 with a direct current voltage from the electronic analyzer 9.

The output signal of the frequency converter 6 is transmitted in the form of a voltage or current with variable frequency by the connecting conductor 10 to the analyzer 9. The motor controller 13 controls two hoisting motors M. By the output conductors 11 and 12 the control of the motors M is so directed that the hoisting motion is switched off during overload of a predetermined degree.

Figure 2:
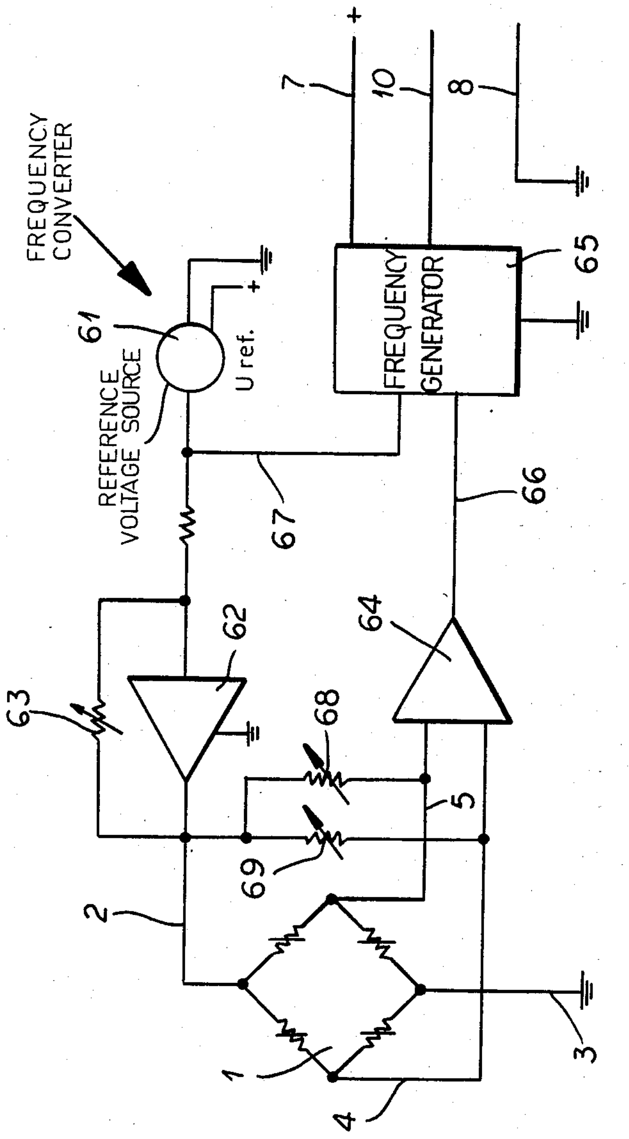
FIG. 2 is a block diagram of the electrical control network of the frequency converter of the apparatus of FIG. 1.

FIG. 2 shows in detail the circuit of the frequency converter 6 and the connection to the tension measuring bridge 1. The tension bridge 1 is a conventional strain-gauge bridge circuit with at least one resistance variable by changes in mechanical tension. The bridge supply voltage is produced and amplified by the operational amplifier 62 from the voltage of the reference voltage source 61. A fixed ratio of the reference to bridge-supply voltage is adjusted by the variable calibration resistor 63.

The bridge output signal is amplified by the operational amplifier 64, whose output signal controls the frequency generator 65 via the conductor 66. The output of the frequency generator 65 is a periodic signal across conductors 8 and 10, such that the frequency changes proportionally according to the change of the bridge output signal provided across conductors 4 and 5.

The frequency generator 65 is a known electrical circuit, namely a voltage-controlled oscillator whose output frequency is proportional to the control signal delivered by conductor 66 and to the reference potential delivered by the conductor 67 between the frequency generator 65 and bridge supply voltage generator.

A change of the reference voltage down to a lower value causes therefore a proportional change of the output frequency to a higher value. The output signal of the tension measuring bridge 1 and therefore the control signal for the frequency generator 65 changes proportionally to and in the same direction as the bridge voltage. On the other hand the change of the output frequency of the frequency generator 65 is proportional to, but in the opposite direction to, the reference voltage change. Thus the influence of the reference voltage fluctuations on the output signal are compensated for automatically. The novel combination of the tension measuring bridge 1, bridge supply voltage generator and reference voltage source 61 and frequency generator 65 allows the automatic compensation. The circuit of FIG. 2 is supplied with a simple direct current voltage, which would not otherwise provide the required precision and constancy for the tension measuring bridge 1, this d.c. being applied as the supply to the voltage-controlled oscillator and the reference voltage source.

With the variable resistances 68 and 69 the offset voltages of the tension measuring bridge 1 can be so calibrated that in the unloaded tension measuring bridge 1 the output signal has a fixed base frequency. With the variable resistance 63 the sensitivity of the bridge circuit by the bridge supply voltage is so calibrated that with the nominal tension the output signal has the nominal frequency. An additional variation of the frequency generator 65 is not necessary.

Figure 3:
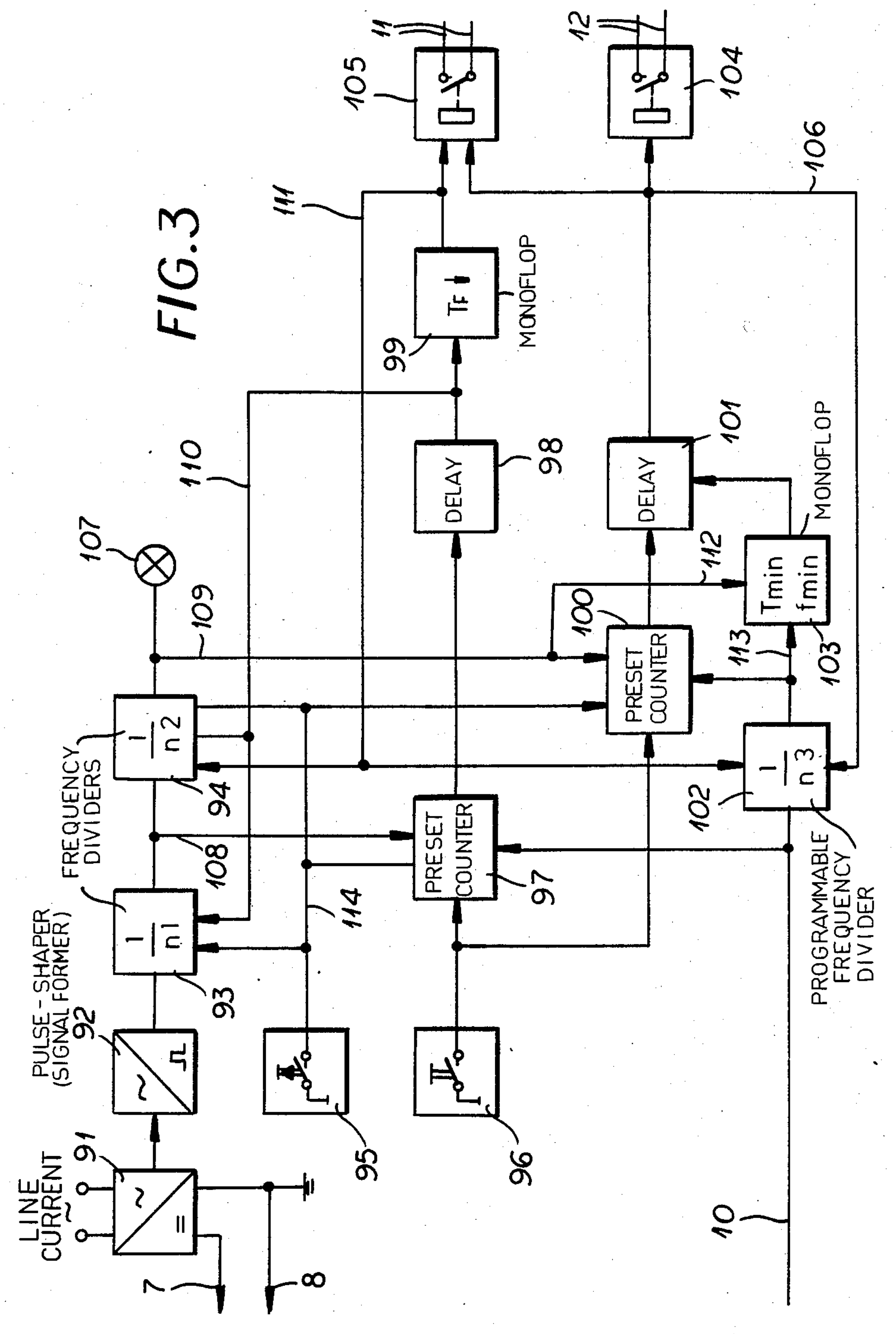
FIG. 3 is a block diagram of the electrical control network of the electronic analyzer of the apparatus of FIG. 1.

FIG. 3 shows the circuits of the analyzer 9.

The analyzer 9 comprises a rectifier 91 supplying the dc output across lines 7, 8, as already described and delivering its ac signal from the line to a pulse shaper 92. The latter outputs a train of pulses at the cadence of the line frequency to a divider 93 with a ration $1/n_1$ to establish a first gating interval. The output of divider 93 is delivered to divider 94 with a ratio $1/n_2$ so that the latter outputs pulses of a frequency $f/(n_1 \cdot n_2)$, where f is the line frequency, to establish a second gating interval. These gating intervals are equivalent to sampling times.

A pair of counters 97 and 100 can be preset with respective counts (and can be downcounted therefrom) by the switches 95, 96 and are connected to the dividers 93 and 94 so as to be effective during the gating intervals or for the respective sampling times.

Downcounting pulses are supplied to the previously set counter 97 directly via line 10 delivering a train of signals at a frequency which is proportional to the load from the frequency converter 6 (FIGS. 1 and 2). As will be described below, the previously set counter 100 can be downcounted by the signals from line 10 divided in a ratio of $1/n_3$ by the programmable frequency divider 102. The count prestored in each counter represents a threshold value so that, if the stored count is exceeded by the downcount in the respective sampling period, the counter outputs as signal which is designed to interrupt hoist operation. The counter outputs are applied through respective delay circuits 98 and 101.

A switching relay 105, receiving the output of preset counter 97 when the downcount pulses from line 10 exceed during the sampling period the preset count in this counter, via the delay circuit 98 and a monoflop 99, controls of the fast hoist speed motor via lines 11 running to the motor controller 13.

Another switching relay 104, receiving the output of preset counter 100 when the downcount pulses from line 10, divided by divider 102, exceed during the sampling period the preset count in this counter, via the delay circuit 101, controls the other motor via lines 12 running to the motor controller 13. The relay 105 is also operated by the output from the delay circuit 101.

The input signal 10 for the counter 100 is divided by the programmable frequency divider 102 in ratios of $1/n_3$. The starting values for the counter 97 and 100 are inputted by the multipole switches 95, 96. The counter 97 in the null or zero state (when fully downcounted) produces an output signal, whose duration is extended by the time delay 98, so that the resulting pulse can operate the monoflop 99.

Likewise the counter 100 is provided with the time delay circuit 101, whose output signal controls the output elements, advantageously the switch relays 104 and 105, which shut off the hoisting motors via the output conductors 11 and 12.

The output signal from the time delay circuit 101 controls the $1/n_3$ frequency divider 102 via the connecting conductor 106 in such manner that the ratio between input and output frequencies is increased. The output signal from the time delay circuit 98 triggers the monostable circuit or monoflop 99, so that for the duration of the return time, the switch relay 105 switches off the hoisting motor with the fast hoist speed with the output conductor 11.

The time of activation of the counter 100 is determined by the gate time or gate pulse duration, and is produced by the $1/n_2$ frequency divider 94 from the line frequency of the power supply line of the power supply. Instead of the line frequency source any other standard frequency sources can be used.

The current supply member 91 of the analyzer 9 is supplied from the alternating current circuit and supplies the frequency converter 6 via the conductors 7 and 8. The signal shaper 92 processes the input signal from the circuit frequency for the $1/n_1$ frequency divider 93.

The outgoing signal from the frequency divider $1/n_1$ 93 introduces a first gate pulse, for example 80 ms, into the counter 97 by the connecting conductor 108 in its initial state, and is the input signal for the controllable frequency divider $1/n_2$ 94, which puts a second or third gate pulse into the counter 100 via the conductor 109 in its initial state. The gate pulse frequency of the frequency divider $1/n_2$ 94 is indicated by the indicator light 107. With the aid of the blinking frequency of the indicator light the functional state of the gate pulse transmitter can be monitored.

In raising of a load the counter 97 operates with the first sampling or gating time, while the counter 100 operates with a longer second sampling or gating time. Based on the counts preset by the switch 96 the counter 97 reaches the null state with a given partial load, for example 25% of the rated load during the first sampling or gating time. The counter 100 for limiting the load, responds for example at 105% of the rated load to reach the null state during the second gating or sampling period.

When the given partial load is exceeded, the outgoing signal from the counter 97 triggers via the time delay 98 the monostable circuit or monoflop 99 and therefore switches off the fast hoisting speed for the adjustable delay time.

Via the conductor 111 the $1/n_2$ frequency divider 94 is so controlled that the sampling time of the counter 100 is foreshortened and the $1/n_3$ frequency divider 102 is controlled, so that the input frequency (from line 10) for counter 100 is increased over the shortened sampling duration. Upon the shut off of the fast hoisting velocity in raising of the load and by simultaneously shortening gate pulse, the response time of the analyzer 9 is shortened, when the limiting load is exceeded and the response lag of the hoist is shortened.

For synchronization the frequency dividers 93 and 94 are reset by the trigger signal for the monoflop 99 coming over the connecting conductor 111.

After the delay time runs out, the monoflop 99 again switches on the fast hoisting speed provided of course that the counter 100 does not register a signal representing that the predetermined limiting load has been exceeded. The counter 100 operates then again with the second sampling or gating time. This second sampling or gating time is advantageously selected so that it is equal to or greater than the period of the load oscillations of a hanging load.

In hoist operation with only one hoist speed the function of the monoflop 99 is blocked by a switch or a short-circuiting or shunt bridge. Both the switch relays 104 and 105 have then the same function and are controlled only by the time delay 101 when the load limit is exceeded.

For functional monitoring of the main circuit a subsequently triggerable monostable sweep circuit 103 controls a gate pulse for the counter 100 via the conductor 112, the frequency generation being the result of the $1/n_3$ frequency divider. In keeping below the preset ratio between the gate pulse and the network time constant or in keeping below the minimum frequency the monoflop 103 is not subsequently triggered, so that the output reaches the stable state and the time delay 101 shuts off the hoist motion.

For manual operator control the testing key or button 95 is provided. Via the conductor 114 the counters 97 and 100 are set in their adjustable initial state and the $1/n_1$ frequency divider 93 and the $1/n_2$ frequency divider 94 is cut off so that by operation of the testing key 95 the gate pulse is arbitrarily extended. In ordinary functions of the transmitter and analyzer 9 the counters 97 and 100 reaches the null state, so that the associated shut off of the hoist operation is terminated. Additionally by a time measurement with a stop watch with an empty hoist hook or known load the adjustable load limit can be controlled. For the applicable load pick up both the output frequency without load and the output frequency with the rated load are known. For monitoring the adjustable load limit of the hoist the monoflop 99 is cut out in the above described way, which the output of the analyzer 9 should control, when the counter 100 reaches the null state.

By operation of the testing key 95 and start of the stop watch the testing process is started. The stop watch is halted, when the output is switched off. In this case the counter 100 is decremented with a known frequency and reaches the null state at the end of the measured time. From the measured time the initial states of the counters and the load limit can be computed.

We claim:

1. In a hoist with at least one hoist motor, a motor controller for said hoist motor, and an overload safety device operating on said motor controller, wherein said overload safety device includes a cable load pick up with a tension measuring bridge, and an analyzer said tension measuring bridge being connected by two conductors to a bridge supply voltage generator and having two output conductors for transmission of an output signal of said tension measuring bridge, said analyzer acting on said motor controller, the improvement wherein between said analyzer and said tension measuring bridge a frequency converter with a frequency generator is connected, said frequency converter transforming said output signal of said tension measuring bridge into a periodic signal;

said analyzer has at least one counter with a settable initial state, at least one switch and one frequency divider;

said frequency divider produces a periodic control signal as a gate pulse for said counter from a reference frequency of a reference signal source;

cycles of said frequency generator are countable with said counter during said gate pulse;

said motor controller is cut out by said counter when a given counting state is reached; and said gate pulse is adjustable so that the duration of said gate pulse is at least equal to the period of said load fluctuations.

2. The improvement according to claim 1 wherein said frequency converter includes said bridge supply voltage generator, and that a reference voltage is supplied to said bridge supply voltage generator and said frequency generator, wherein the ratio between said reference voltage and said bridge supply voltage is calibrated.

3. The improvement according to claim 2 wherein said frequency converter for a null load is calibrated to correspond to a minimum frequency.

4. The improvement according to claim 2 wherein said analyzer, said frequency signals, and said gate pulse are monitored.

5. The improvement defined in claim 2 wherein said hoist has a slow speed and a fast speed, said analyzer having a first counter and a second counter, which are supplied with different ones of said gate pulses by said frequency divider, one of said gate pulses being associated with a given partial load and said first counter, a second one of said gate pulses being associated with the null load and said second counter, said fast speed being cut out during said slow speed.

* * * * *